(12) United States Patent
Goodwin, III

(10) Patent No.: US 6,445,370 B1
(45) Date of Patent: Sep. 3, 2002

(54) ELECTRONIC PRICE LABEL AND METHOD OF GRAPHICALLY DISPLAYING RELATIVE INFORMATION BY AN ELECTRONIC PRICE LABEL

(76) Inventor: John C. Goodwin, III, 2306 Wesfork Ct., Suwanee, GA (US) 30024

( * ) Notice: Subject to any disclaimer, the term of this patent is extended or adjusted under 35 U.S.C. 154(b) by 0 days.

(21) Appl. No.: 09/312,457

(22) Filed: May 14, 1999

(51) Int. Cl.[7] .............................. G09G 3/36; G09G 3/04
(52) U.S. Cl. .......................... 345/87; 345/35; 235/383; 705/20
(58) Field of Search .................... 238/383; 340/825.35; 705/20; 364/401; 235/383; 345/32–54, 87

(56) References Cited

U.S. PATENT DOCUMENTS

| 4,002,886 A | | 1/1977 | Sundelin ................ 235/61.7 R |
|---|---|---|---|
| 4,500,880 A | | 2/1985 | Gomersall et al. ...... 340/825.35 |
| 4,924,363 A | | 5/1990 | Kornelson ................... 362/125 |
| 5,172,314 A | * | 12/1992 | Poland et al. ............... 364/401 |
| 5,401,947 A | * | 3/1995 | Poland ........................ 235/383 |
| 5,448,226 A | * | 9/1995 | Failing, Jr. et al. ..... 340/825.35 |
| 5,771,005 A | * | 6/1998 | Goodwin, III ......... 340/825.35 |
| 5,854,474 A | * | 12/1998 | Goodwin, III .............. 238/383 |
| 5,870,714 A | * | 2/1999 | Shetty et al. .................. 705/20 |
| 6,021,395 A | * | 2/2000 | Goodwin, III ............... 705/20 |
| 6,269,342 B1 | * | 7/2001 | Brick et al. .................... 705/20 |

* cited by examiner

Primary Examiner—Steven Saras
Assistant Examiner—Srilakshmi K. Kumar
(74) Attorney, Agent, or Firm—Paul W. Martin; Priest & Goldstein, PLLC

(57) ABSTRACT

An electronic price label which displays relative information, such as employee-directed business information. The electronic price label includes a liquid crystal display and control circuitry. The liquid crystal display includes a first portion for displaying employee-directed business information and a second portion for displaying price information. The first portion includes a plurality of segments arranged linearly as a relative scale for displaying the employee-directed business information. The control circuitry receives the employee-directed business information, determines a number of adjacent segments in the first portion to be activated based upon the employee-directed business information, and activates the number of adjacent segments.

17 Claims, 10 Drawing Sheets

ELECTRONIC PRICE LABEL AND METHOD OF GRAPHICALLY DISPLAYING RELATIVE INFORMATION BY AN ELECTRONIC PRICE LABEL

CROSS-REFERENCE TO RELATED APPLICATIONS

The present invention is related to the following commonly assigned and co-pending U.S. applications:

"System and Method of Graphically Displaying Relative Information By An Electronic Price Label", filed May 14, 1999, invented by Goodwin, and having Ser. No. 09/312,458; and "System and Method of Verifying Graphically Displayed Relative Information", filed May 14, 1999, invented by Goodwin, and having Ser. No. 09/312,456.

BACKGROUND OF THE INVENTION

The present invention relates to electronic price label (EPL) systems, and more specifically to an electronic price label and method of graphically displaying relative information by an electronic price label.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs typically include liquid crystal displays (LCDs) for displaying information. A typical EPL may include an LCD capable of displaying a minimum of eight characters of alphanumeric text information. Each character includes a number of segments which are turned on or off to generate a character. EPLs may also include icons for displaying limited amounts of graphical information about a product.

In order to obtain a competitive advantage, retailers must effectively market their products and have access to information about their products. For example, inventory and sales figures are important in running a retail business. The type and frequency of information may vary based upon job description. A stock person typically needs "daily quantities sold" information. A person placing orders needs another type of information, "what is in stock" and "what is on order" information. A manager needs another type of information, "how does this item rank against others" information.

Access to employee-directed competitive information is typically available only through a centralized in-store computer. Thus, to determine business information about items, employees get the information directly from the computer or from reports generated by the computer.

Therefore, it would be desirable to display competitive, promotional, and other relative information anywhere in a transaction establishment through an electronic price label system.

SUMMARY OF THE INVENTION

In accordance with the teachings of the present invention, an electronic price label and method of graphically displaying relative information by an electronic price label is provided.

The electronic price label includes a liquid crystal display and control circuitry. The liquid crystal display includes a first portion for displaying employee-directed business information and a second portion for displaying price information. The first portion includes a plurality of segments arranged linearly as a relative scale for displaying the employee-directed business information. The control circuitry receives the employee-directed business information, determines a number of adjacent segments in the first portion to be activated based upon the employee-directed business information, and activates the number of adjacent segments.

The method of displaying employee-directed business information by an electronic price label includes receiving a message containing the employee-directed business information from a computer by control circuitry within the electronic price label, storing the employee-directed business information in a memory within the electronic price label by the control circuitry, determining a number of adjacent linearly-arranged segments to be activated in a first portion of a liquid crystal display within the electronic price label for displaying employee-directed business information based upon the employee-directed business information, and activating the determined number of adjacent segments.

It is accordingly an object of the present invention to provide an electronic price label and method of graphically displaying relative information about a product associated with an electronic price label by the electronic price label.

It is another object of the present invention to provide a system and method of graphically displaying relative information about a product associated with an electronic price label by the electronic price label.

It is another object of the present invention to provide a system and method of graphically displaying competitive information about a product associated with an electronic price label by the electronic price label.

It is another object of the present invention to provide a system and method of graphically displaying promotional information about a product associated with an electronic price label by the electronic price label.

It is another object of the present invention to provide a system and method of graphically displaying relative information about a product which include the capability to change the level and the information to be displayed.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
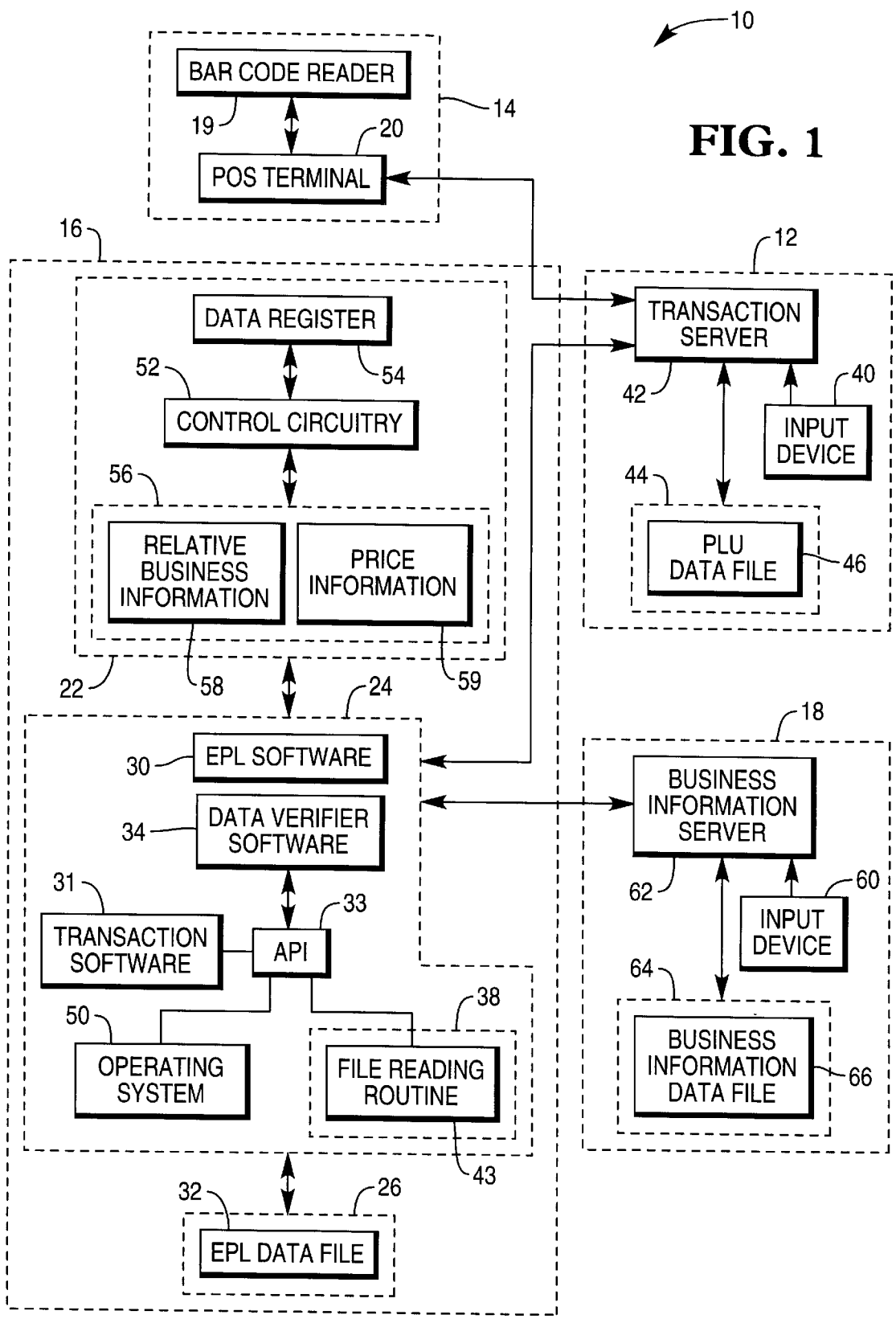
FIG. 1 is a block diagram of a first embodiment of a transaction processing system.

Referring now to FIG. 1, a first embodiment of transaction system 10 primarily includes host computer system 12, point-of-sale (POS) system 14, EPL system 16, and business information system 18. Here, components 12, 14, 16, and 18 are shown as separate components that are networked together, but they may also be combined in different ways to form less components. Thus, host computer system 12 may be a POS terminal which doubles as a host computer for network of other POS terminals. Also, host computer system 12 and business information system 18 may be combined into a single system.

POS system 14 includes bar code reader 19 and terminal 20.

EPL system 16 primarily includes EPLs 22, host EPL terminal 24, and EPL storage medium 26.

EPLs 22 include control circuitry 52, data registers 54 and displays 56.

Control circuitry 52 receives and transmits messages from EPL terminal 24 and controls display of information by display 56. Control circuitry 52 stores data within the messages, such as price, promotional, and relative business information, in data registers 54.

Under the present invention, relative business information is displayed in portion 58 while price information is displayed in second portion 59, but both types of information may be combined into a single data message prior to transmission to EPL 22.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting data to EPLs 22. EPL software 30 obtains prices in price look-up (PLU) data file 46 as they are entered in input device 40 or after they have been stored within PLU data file 46. Similarly, EPL software 30 obtains business information in business information data file 66 as it is entered in input device 60 or after it has been stored within business information data file 66.

EPL terminal 24 also executes EPL data verifier software 34, which is responsible for verifying that prices displayed by EPLs 22 for items stored within EPL data file 32 are the same as prices for those items contained within PLU data file 46. EPL data verifier software 34 is also responsible for verifying that business information displayed by EPLs 22 is the same as data for the items contained within business information data file 66. EPL data verifier software 34 combines business information from business information data file 66 with price data from PLU data file 46 into a single checksum entry in EPL data file 32.

Host EPL terminal 24 executes application programming interface (API) 33, which has hooks to operating system 50 or transaction software 31. For example, a commercially-available API exists for the UNIX and OS/2 operating systems of Novell and IBM, and the UNITY POS software of NCR Corporation. Data verifier software 34, as well as other independent applications, have hooks to API 33.

Host EPL terminal 24 also executes file reader 38, which is compiled to run on operating system 50 or on transaction software 31, depending on the needs of the transaction establishment. File reader 38 directly accesses PLU information in PLU data file 46 and business information data file 66, as an alternative to maintaining local duplicates of PLU data file 46 and business information data file 66.

File reader 38 is linked to API 33 through interprocess communications and includes file reading routine 43 which works with API 33 to cause transaction software 31 or operating system 50 to read PLU data file 46 and business information data file 66 and transfer PLU information and business information to data verifier software 34.

EPL storage medium 26 stores EPL data file 32. EPL storage medium 26 and is preferably a fixed disk drive.

EPL data file 32 contains EPL identification and checksum information. Checksum information is calculated from price information in PLU data file 46 and business information in business information data file 66. EPL data file 32 contains current information displayed by EPLS 22.

Host computer system 12 includes PLU storage medium 44, transaction server 42, and input device 40.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 19.

Input device 40 is preferably a keyboard.

Business information system 18 includes business information storage medium 64, business information server 62, and input device 60.

Business information server 62 manages employee-directed business information.

Business information storage medium 64 stores business information data file 66. Business information data file 66 may be a database, data warehouse, plan-o-gram database, in-store data file, or other source of business information. Business information in business information data file 66 is available for distribution to EPL system 16.

Input device 60 is preferably a keyboard.

Figure 2:
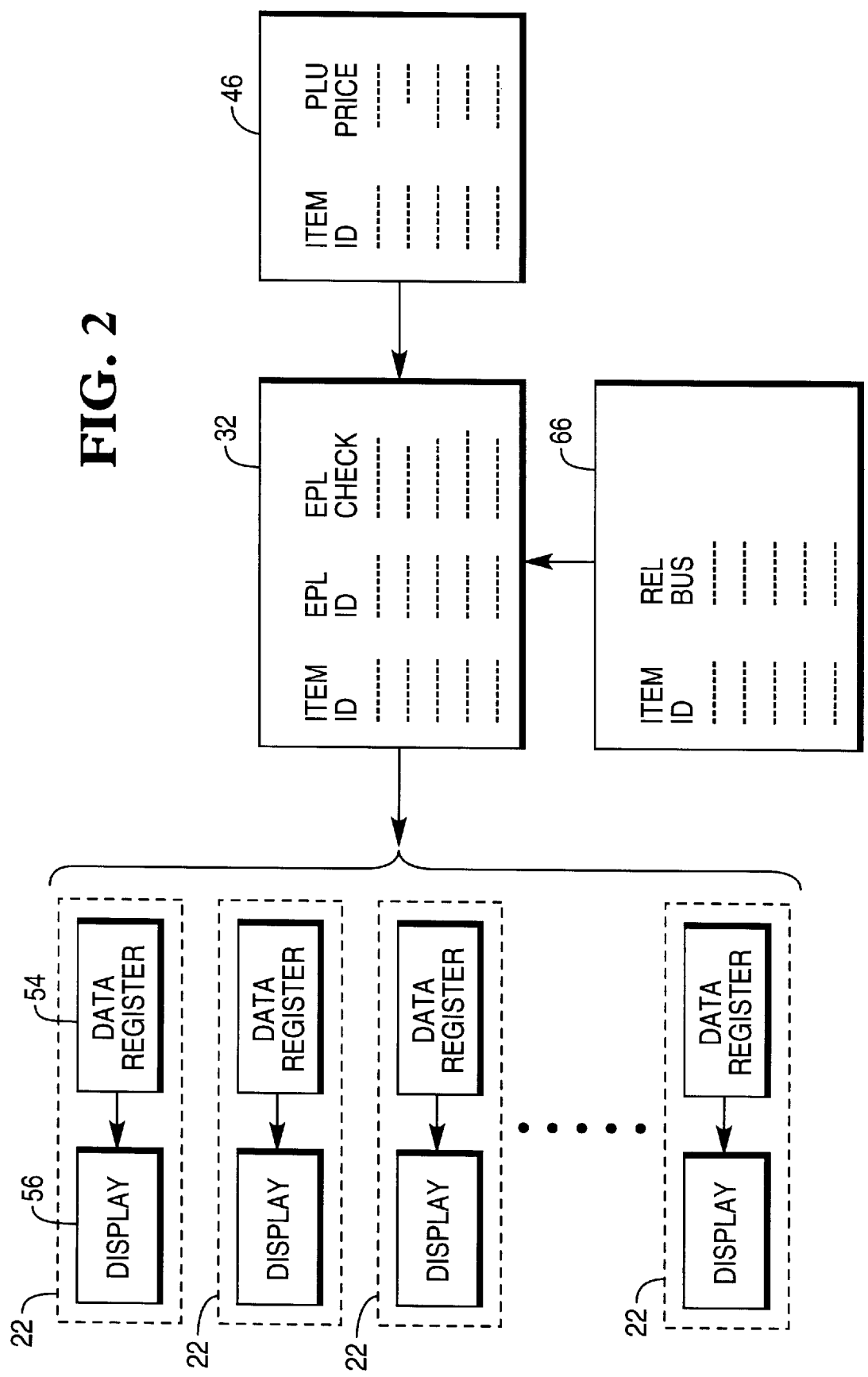
FIG. 2 is a diagram showing data files used within the transaction establishment of FIG. 1.

Turning now to FIG. 2, EPL data file 32, PLU data file 46, and business information data file 66 are shown in more detail.

EPL data file 32 includes a line entry for each EPL 22 in EPL system 16. Each line entry has an item identification entry (ITEM ID), an EPL identification entry (EPL ID), and an EPL checksum value entry (EPL CHECK).

Entry ITEM ID identifies a store item. Entry EPL ID identifies which EPL is assigned to the item. Entry EPL CHECK is a checksum value of the digits of the combined price and business information that is displayed by display 56.

PLU data file 46 includes a line entry for each item sold in the transaction establishment. Each line entry should have at least an item identification entry (ITEM ID) and a PLU price entry (PLU PRICE).

Entry ITEM ID identifies a store item. Entry PLU PRICE identifies the price read by POS system 14 to determine the price of each item during scanning by bar code reader 19.

Business information data file 66 includes a line entry for items sold in the transaction establishment. Each line entry has an item identification entry (ITEM ID) and may have a business information entry (RELBUS).

Entry ITEM ID identifies a store item. Entry RELBUS could be an entry which identifies the relative profitability of the item.; Profit, sales dollars, sales quantity (daily, monthly, quarterly, or last year, etc.), quantity on order, quantity in stock, and quantity to stock are all examples of different types of business information. Entry RELBUS may be modified, or if additional entries are present, a primary entry for display may be designated in business information data file 66. Business information can come from one or more files, for example, sales data from one file, quantity on order from another, and history data from another, etc.

During normal operation, EPL data verifier software 34 executes file reader 38 to obtain price information from PLU data file 46 and business information from business information data file 66. EPL data verifier software 34 combines the price and business information into display data and causes EPL software 30 to send the display data to an EPL 22. EPL 22 receives the display data, stores the display data in data registers 54, and causes display 54 to display the display data. Display 56 displays the price information in portion 59 and the business information in portion 58.

During a mismatch situation, the price information from PLU data file 46 does not agree with the price displayed by EPL 22 and/or the business data from business information data file 66 does not agree with the business information displayed by EPL 22. EPL data verifier software 34 combines a price for the item from PLU data file 46 with business information for the item from business information data file 66, creates a checksum of the combined data, and compares the checksum with the previously created checksum stored within EPL data file 32. If the checksums do not match, then EPL data verifier software 34 sends the new price and business data to EPL 22 with a command to display the new price and business data.

Figure 3:
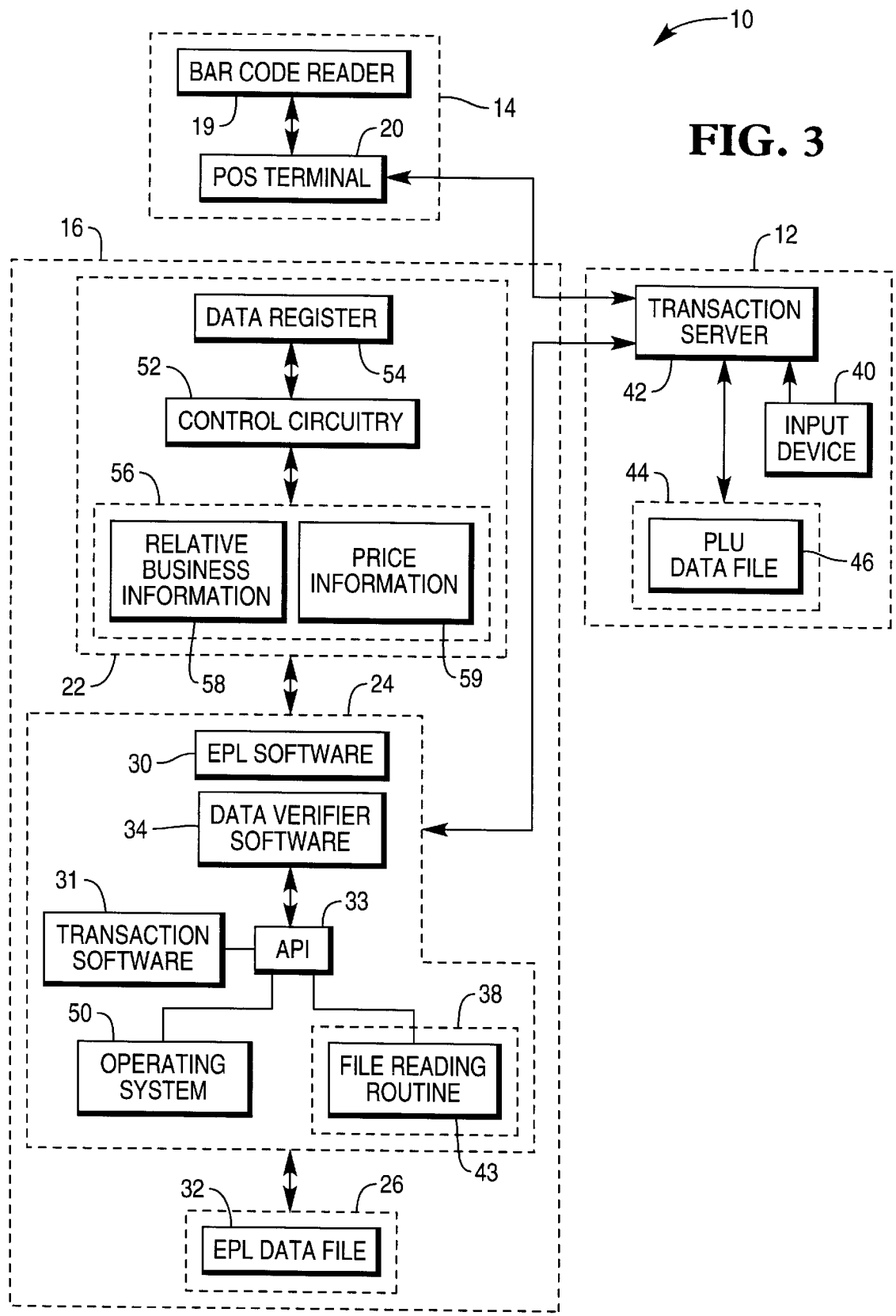
FIG. 3 is a block diagram of a second embodiment of the transaction processing system.

Referring now to FIG. 3, a second embodiment of transaction system 10 is similar to the first embodiment, except that it does not include a separate business information system. Under the second embodiment, business information is stored within PLU data file 46.

EPL software 30 obtains prices and relative business information in PLU data file 46 as they are entered in input device 40 or after they have been stored within PLU data file 46.

As in the first embodiment, EPL data verifier software 34 uses file reader 38 to obtain price information and business information, except that file reader 38 obtains both price and business information from PLU data file 46.

Figure 4:
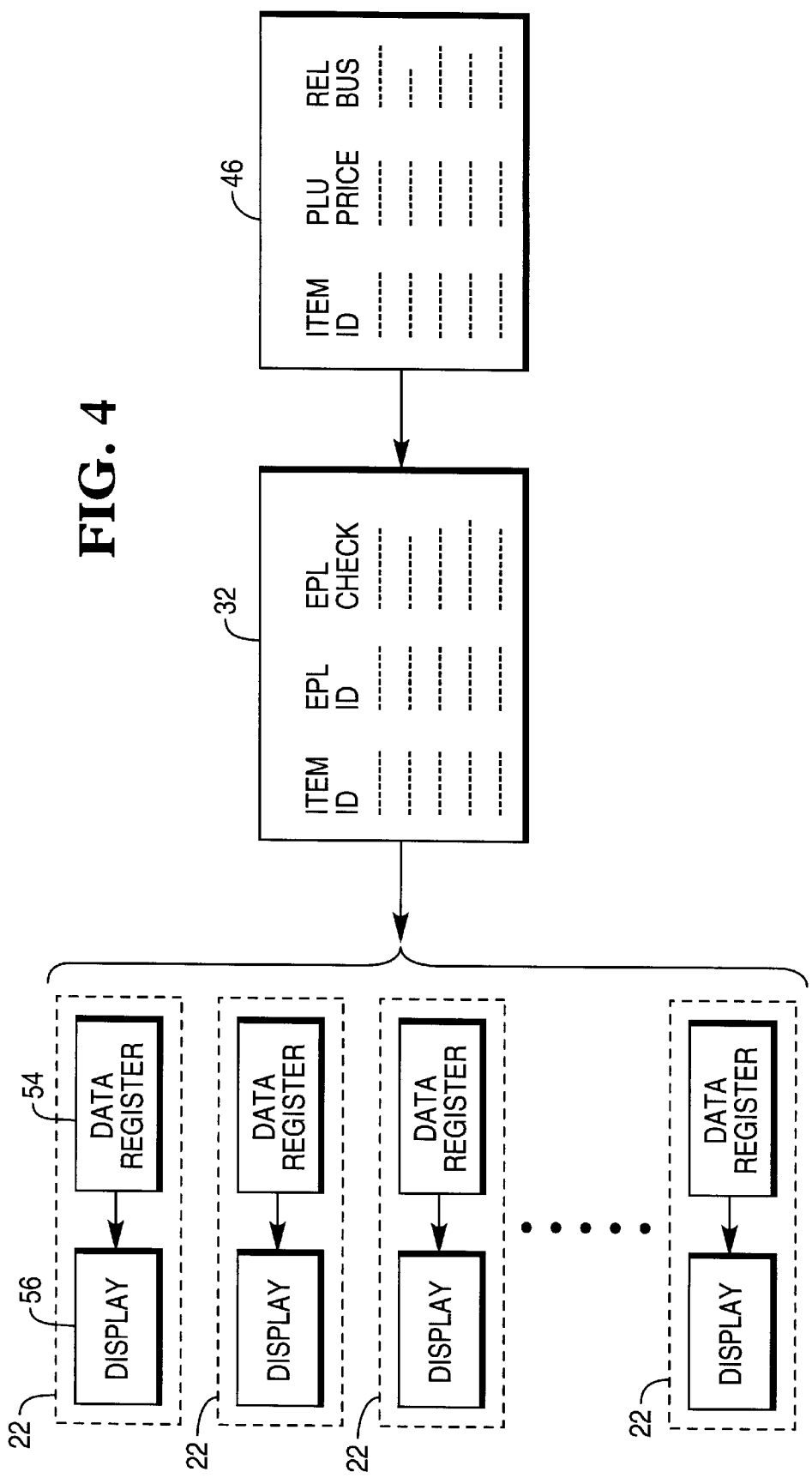
FIG. 4 is a diagram showing data files used within the transaction establishment of FIG. 3.

Turning now to FIG. 4, EPL data file 32 and PLU data file 46 are shown in more detail.

EPL data file 32 includes the same line entries as in FIG. 2.

PLU data file 46 combines the PLU data file 46 of FIG. 2 with the business information data file 66 of FIG. 2. PLU data file 46 includes a line entries ITEM ID, PLU PRICE, and at least one business information entry RELBUS.

During normal operation, EPL data verifier software 34 executes file reader 38 to obtain price and business information from PLU data file 46. EPL data verifier software 34 combines the price and business information into display data and causes EPL software 30 to send the display data to an EPL 22. EPL 22 receives the display data, stores the display data in data registers 54, and causes display 54 to display the display data. Display 56 displays the price information in portion 59 and the business information in portion 58.

During a mismatch situation, EPL data verifier software 34 operates as in the first embodiment. EPL data verifier software 34 combines price and business information from PLU data file 46, creates a checksum of the combined data, and compares the checksum with the previously created checksum stored within EPL data file 32. If the checksums do not match, then EPL data verifier software 34 sends the new price and business data to EPL 22 with a command to display the new price and business data.

Turning now to FIGS. 5A–D, a plurality of different ways of graphically displaying relative business information are illustrated. In each embodiment, display portion 58 includes a plurality of display segments or icons 70 which convey relative level or degree information. These display segments or icons 70 are arranged linearly to form a scale or level indicator. As the level of a predetermined business measure increases, the number of activated display segments or icons increase.

The level information is obtained from business information data in either business information data file 66 or PLU data file 46 and transmitted to EPL 22 with price information. Entry RELBUS contains a list of segments to be activated in order to convey the relative business information for the business measure displayed. An operator modifies this list as the level information changes. The list can also be generated automatically as the level information changes. The display can change meaning by day of week and time of day.

As business information system 18 updates its level information, it can be passed to EPL system 16 to automatically update the displayed information. Data verifier 34 would be scheduled to run as often as business information system 18 updates its level data. Each change in level information requires that a new message be sent to EPL 22. Data verifier 34 detects the changes and initiates new messages.

Figure 5A:
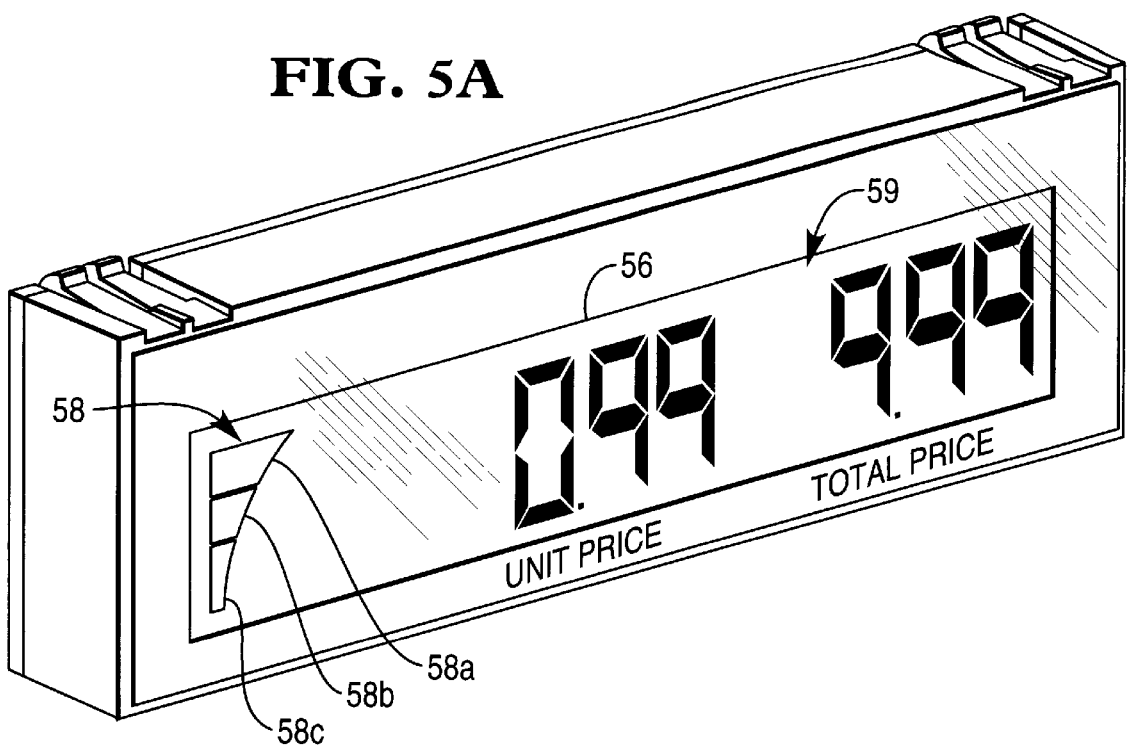
FIG. 5 illustrates several display segments or icons used to display relative business information.
Figure 5B:
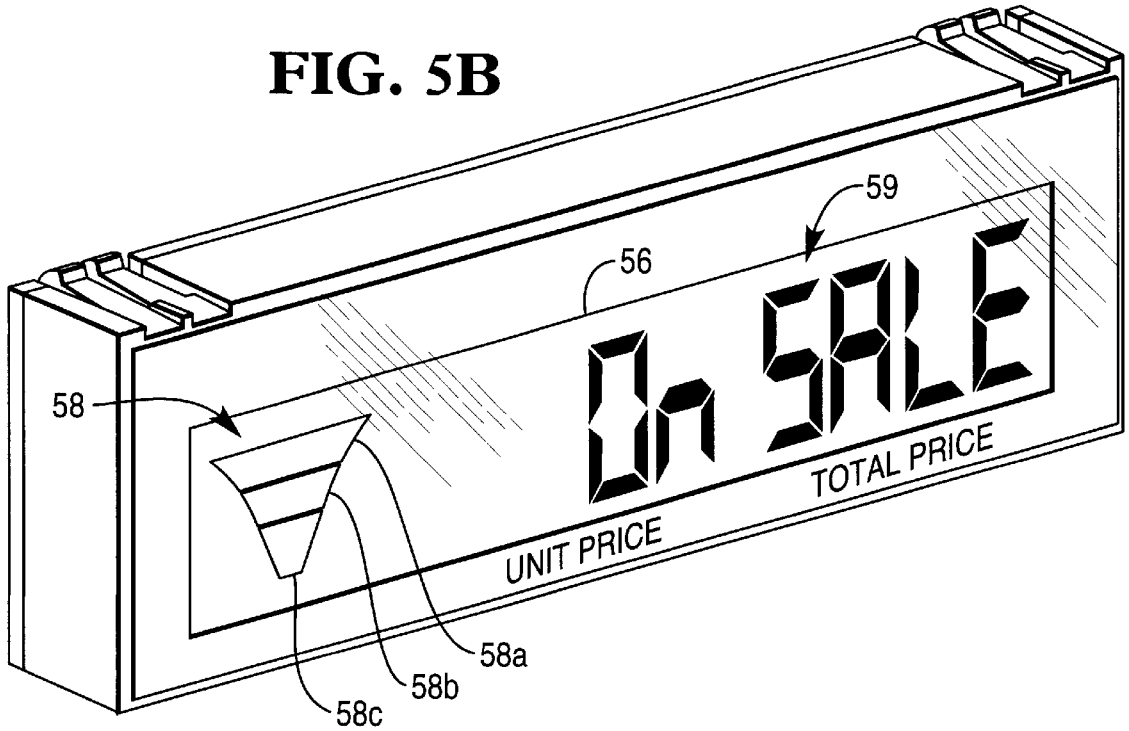

In FIGS. 5A–B, display portion 58 includes three segments 58A–C of increasing size which are activated as the predetermined business measure increases. Thus, none of segments 58A–C are activated when the business measure is at a minimum value, while all three segments 58A–C are activated when the business measure is at a maximum value.

Figure 5C:
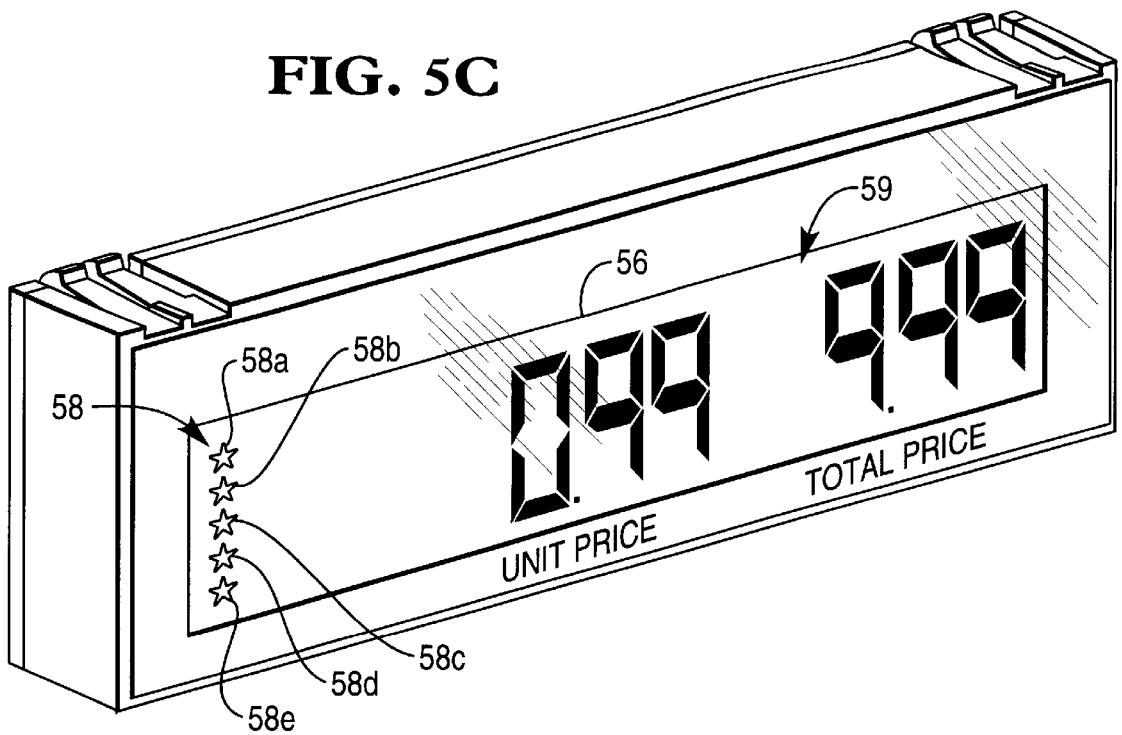

In FIG. 5C, display portion 58 includes five icons 58A–E of equal size arranged in a line.

Figure 5D:
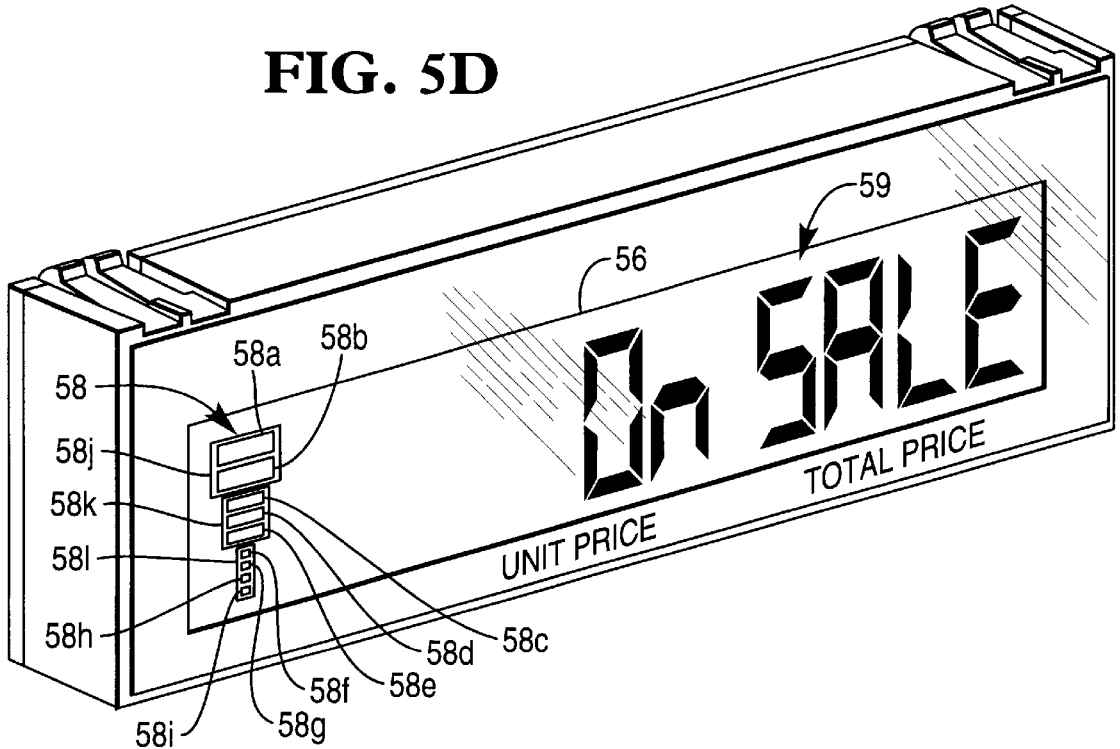

In FIG. 5D, display portion 58 includes nine display segments 58A–I of increasing size surrounded by rectangular markings on display 56 which divide the nine display segments into three equal size groups 58J–L arranged in a line.

In FIGS. 5A–D, portion 59 includes price information, including unit price and total price information, or a promotional message, such as "On Sale".

Figure 6:
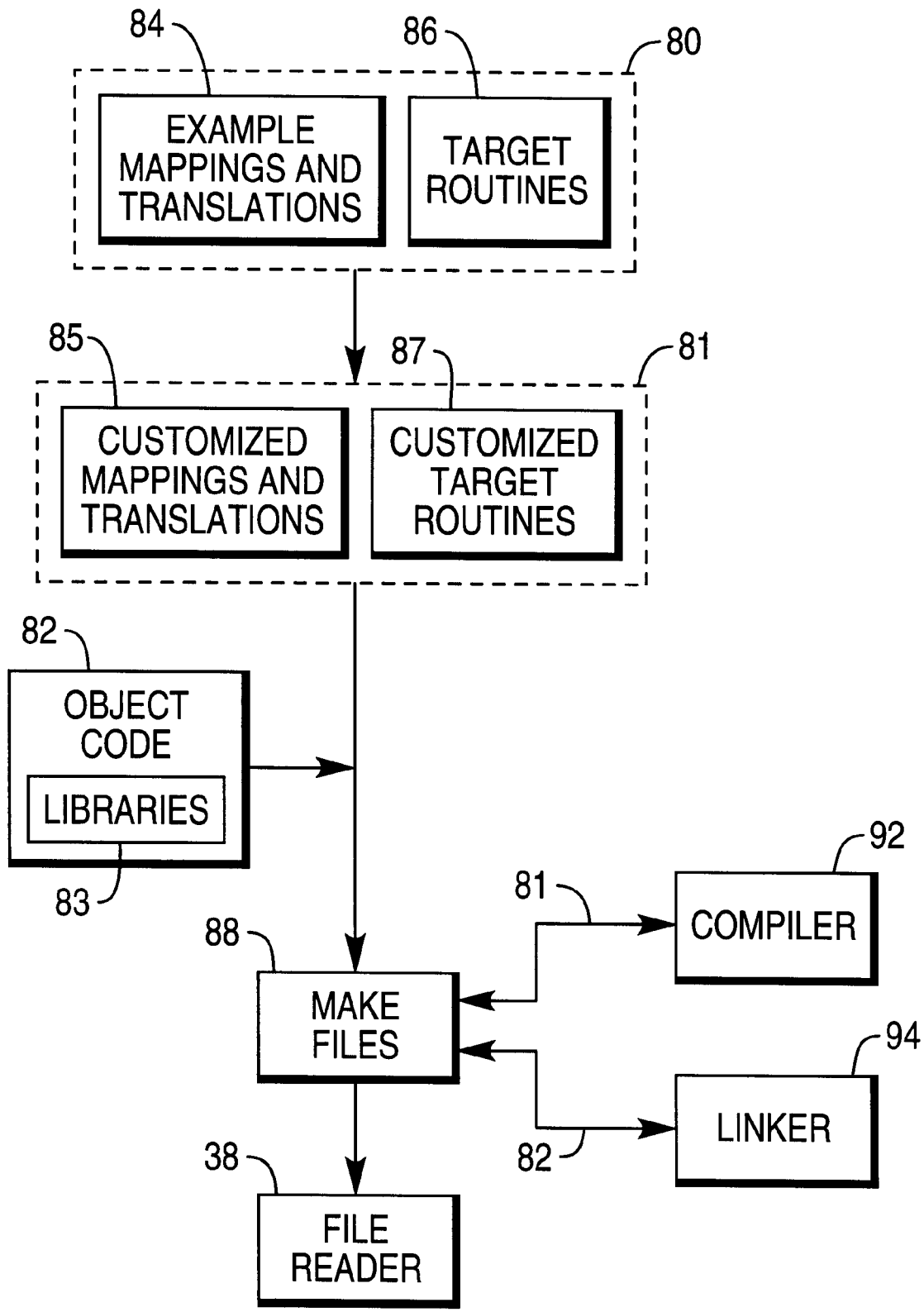
FIG. 6 is a block diagram of a system for producing a file reader program.

Turning now to FIG. 6, the components that are used to construct file reader 38 include template PLU file reader 80, object code 82, example mappings and translations 84, target routines 86, and make files 88. Template PLU reader 80 is a super set of example mappings and translations 84 and target routines 86. Example mappings and translations 84 and target routines 86 are edited and customized by developers to produce customized mappings and translations 85 and customized target routines 87 (customized template 81). File reading routine 43 is an example of a customized target routine. Customized mappings and translations 85 and customized target routines 87 along with object code 82 are fed into make files 88 in order to produce executable code for a file reader 38.

Object code 82 consists of libraries 83 that provide an interface into API 33 and isolate all other EPL applications from API 33, thus allowing the existence of file reader 38. Included in libraries 83 are functions to perform module start up, open PLU data file 46, connect an application to PLU data file 46, close an application's connection to PLU data file 46, close PLU data file 46, open business information data file 66, connect an application to business information data file 66, close an application's connection to business information data file 66, close business information data file 66, and to terminate the application Example mappings and translations 84 provide non-displayable information (in code and/or in documentation) and may be edited to customize file reader 38.

Target routines 86 are routines that may be edited and customized to suit the needs of the target transaction establishment.

Make files 88 are files that pass source code (template 80 and target 81) through compiler 92 and then pass object code 82 through linker 94 to produce the target executable.

Figure 7:
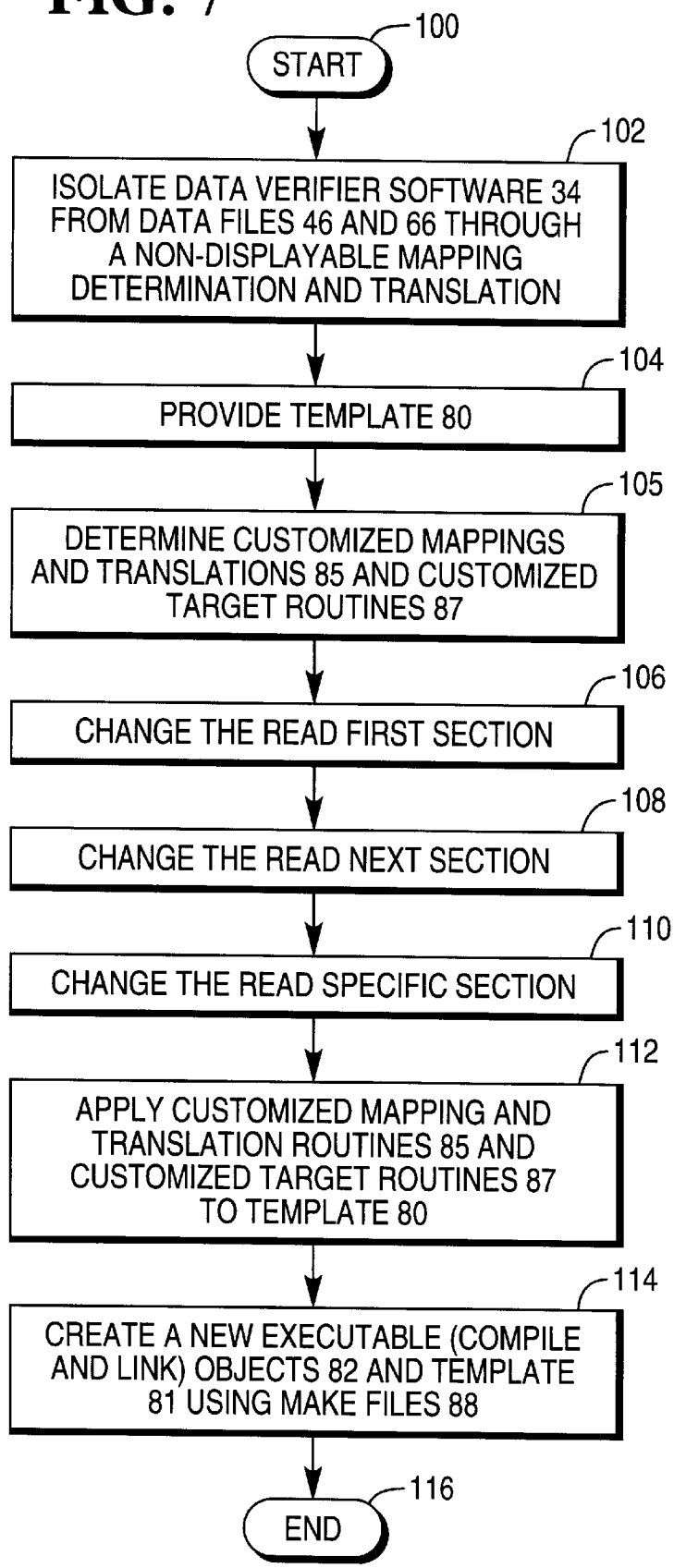
FIG. 7 is a flow diagram illustrating how the file reader is created.

Turning now to FIG. 7, the method of creating file reader 38 begins with START 100.

In step 102, data verifier software 34 is isolated from PLU data file 46 and business information data file 66 through a non-displayable mapping determination and translation process. Example mappings and translations 84 result. This original development effort is provided to customers for future customization.

In steps 104, template 80 is provided. Template 80 is packaged in an installable format that can then be distributed and installed on the target system.

In step 105, customized mappings and translations 85 and customized target routines 87 are determined so that all information for an EPL can be displayed. Connection methods that will be employed for the target system are also determined.

In steps 106–112, customized template 81 is produced by changing template 80 to reflect customized mappings and translations 85. This work is performed by developers who are responsible for the integration of EPL system 16 for a target customer. Integration and customization are directed by the customer. This gives the customer the opportunity to gain a Competitive advantage by displaying the information required to better serve its customers.

In step 106, the "read first" section is changed. The "read first" section is a routine that must be completed/customized to read the first PLU number in PLU data file 46 and the corresponding business information in business information data file 66.

In step 108, the "read next" section is changed. The "read next" section is a routine that must be completed/customized to read the next PLU number in PLU data file 46 and the corresponding business information in business information data file 66 sequentially.

In step 110, the "read specific" section is changed. The "read specific" section is a routine that must be completed/customized to read a specific PLU data file record and a corresponding record in business information data file 66.

In step 112, customized mapping and translations 85 and customized target routines 87 derived from step 105 are applied to template 80.

In step 114, a new executable (file reader 38) is compiled and linked from object code 82 and template 81 using make files 88, compiler 92, and linker 94.

In step 116, the method ends.

Figure 8:
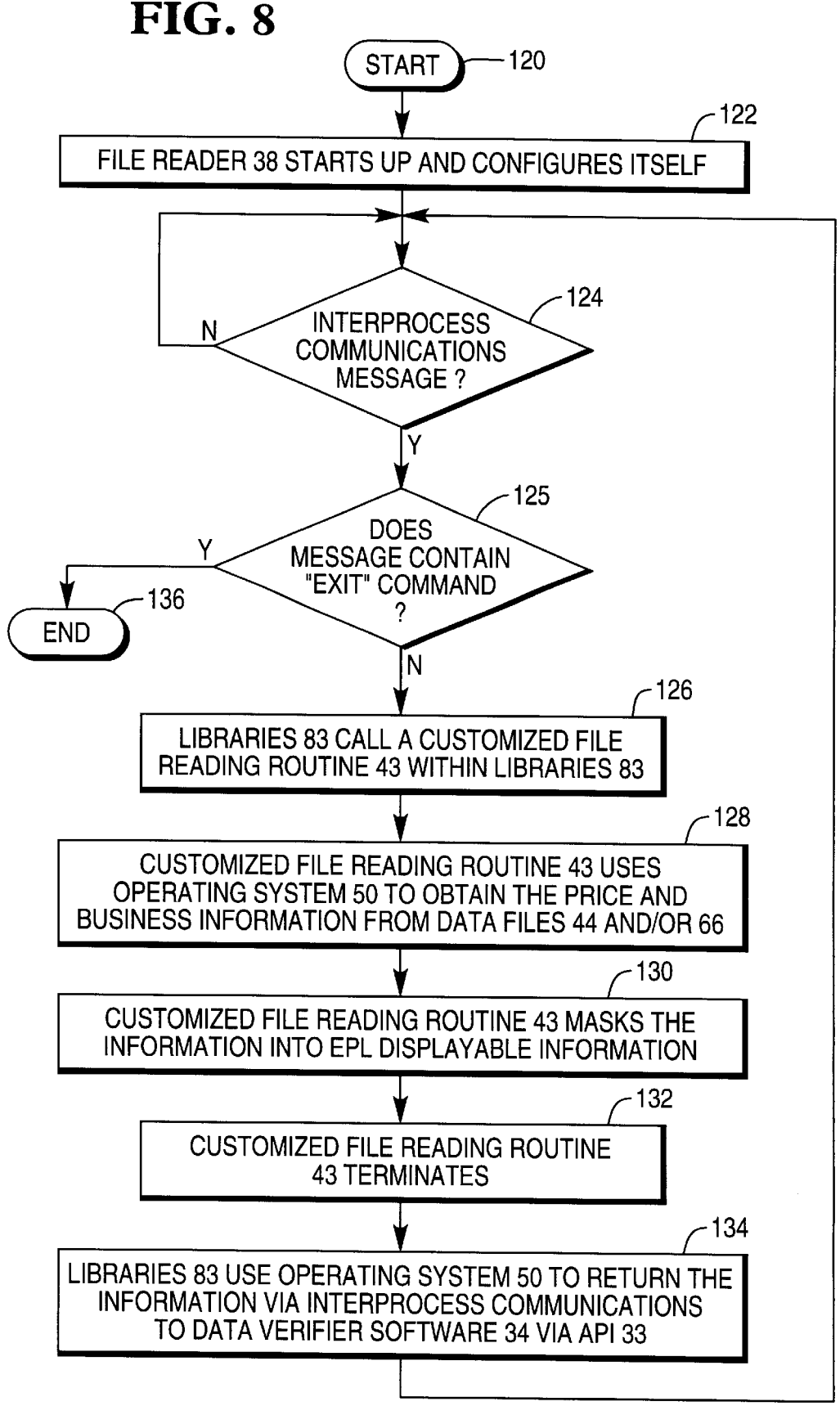
FIG. 8 is a flow diagram illustrating the operation of the file reader program.

Referring now to FIG. 8, the operation of file reader 38 is illustrated in detail, beginning with START 120.

In step 122, file reader 38 starts up and configures itself.

In step 124, file reader 38 waits for an interprocess communications message from API 33. Interprocess communication services (e.g., "queues" for UNIX, threads or pipes for OS/2) are provided by operating system 50. API 33 calls on operating system 50 to send a request from data verifier software 34 to file reader 38, such as a request for price and business information in PLU data file 46 and/or business information data file 66 prior to comparing such information with corresponding information displayed by EPL 22. Data verifier software 34 issues a call to API 33, instructing API 33 to perform a "read direct" routine provided by API 33. API 33 calls on operating system 50 to send the interprocess communications message to file reader 38. Preferably, API 33 passes the message to libraries 83 within file reader 38.

If such a message is received, file reader 38 determines whether the interprocess communications message contains an "exit" command in step 125. If it does, file reader 38 terminates in step 136.

If the interprocess communications message does not contain an "exit" command, libraries 83 call file reading routine 43 within libraries 83 in step 126. File reading routine 43 is customized to the needs of the transaction establishment.

In step 128, file reading routine 43 uses operating system 50 to obtain the price and business information from PLU data file 46 and business information data file 66.

In step 130, file reading routine 43 masks the PLU information from PLU data file 46 and the business information from business information data file 66. Masking would include converting the price and business information into information that is displayable by EPL 22.

In step 132, file reading routine 43 terminates.

In step 134, libraries 83 call on operating system 50 to return the price and business information via interprocess communications to data verifier software 34 via API 33. File reader 38 returns to a waiting state in step 124.

After file reader 38 sends the price and business information to API 33, API 33 passes the price and business information to data verifier software 34. Data verifier software 34 can then compare the price and business information with currently-displayed price and business information, or otherwise examine the information in accordance with the function of application program 35.

Figure 9:
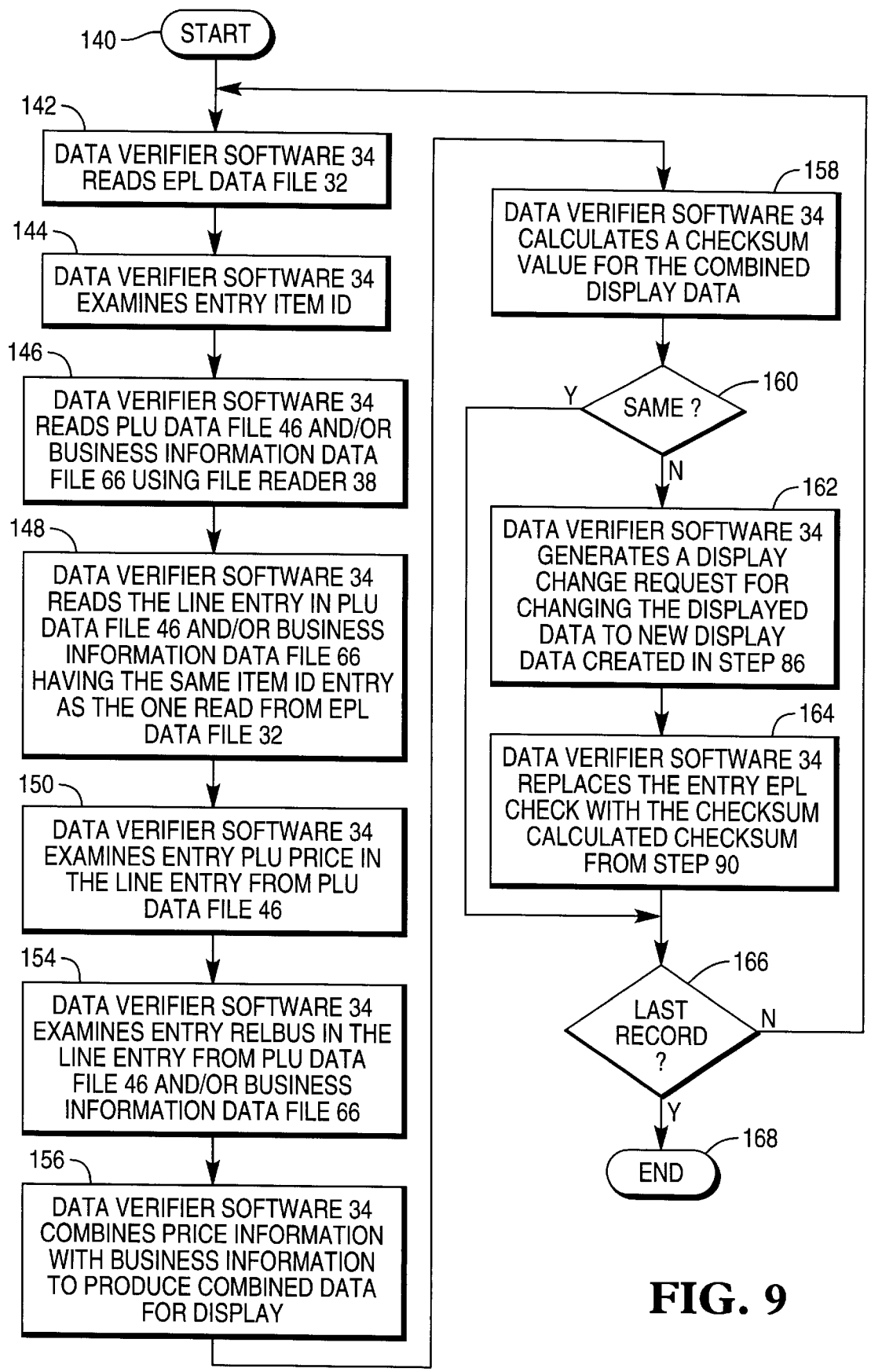
FIG. 9 is a flow diagram illustrating the operation of a data verifier program.

Turning now to FIG. 9, the data verification method of the present invention begins with START 140.

In step 142, data verifier software 34 reads EPL data file 32.

In step 144, data verifier software 34 examines entry ITEM ID.

In step 146, data verifier software 34 reads PLU data file 46 and/or business information data file 66 using file reader 38.

In step 148, data verifier software 34 reads the line entry in PLU data file 46 and/or business information data file 66 having the same ITEM ID entry as the one read from EPL data file 32.

In step 150, data verifier software 34 examines entry PLU PRICE in the line entry from PLU data file 46.

In step 154, data verifier software 34 examines entry RELBUS in the line entry from PLU data file 46 and/or business information data file 66.

In step 156, data verifier software 34 combines price information with business information to produce combined data for display.

In step 158, data verifier software 34 calculates a checksum value for the combined display data.

In step 160, data verifier software 34 compares the calculated checksum value for the combined display data with the entry EPL CHECK in EPL data file 32.

If the calculated checksum value is not the same as the EPL CHECK entry, either the price or the business information for the item having ITEM ID is not the same in both EPL data file 32 and PLU data file 46. Display data mismatch has occurred.

In step 162, data verifier software 34 generates a display change request for changing the displayed data to new display data created in step 156.

In step 164, data verifier software 34 replaces the entry EPL CHECK with the checksum calculated checksum from step 158.

In step 166, data verifier software 34 determines whether the last line entry of EPL data file 32 has been read. If so, the method ends at step 168. If not, the method returns to step 142 to read another line entry from EPL data file 32.

Returning to step 160, if the calculated checksum value is the same as the EPL CHECK entry, the price and business information for the item having ITEM ID in EPL data file 32 are correct. Operation proceeds to step 166.

The data verification method of the present invention may be performed at any time. It is preferable to perform data verification after a loss of either EPL data file 32, PLU data file 46, or business information data file 66.

Although the present invention has been described with particular reference to certain preferred embodiments thereof, variations and modifications of the present invention can be effected within the spirit and scope of the following claims.

What is claimed is:

1. An electronic price label comprising:
   a liquid crystal display including a first portion for displaying employee-directed business information and a second portion for displaying price information, wherein the first portion includes a plurality of segments arranged linearly as a relative scale for displaying the employee-directed business information; and
   control circuitry for receiving the employee-directed business information, for determining a number of adjacent segments in the first portion to be activated based upon the employee-directed business information, and for activating the number of adjacent segments, wherein as the level of the employee-directed business information increases, the number of activated display segments increase.

2. The electronic price label as recited in claim 1, wherein the plurality of segments are arranged vertically.

3. The electronic price label as recited in claim 1, wherein the plurality of segments are of similar size and shape.

4. The electronic price label as recited in claim 1, wherein the plurality of segments are of increasing size.

5. The electronic price label as recited in claim 1, wherein the plurality of segments comprise three segments.

6. The electronic price label as recited in claim 1, wherein the first portion is located left of the second portion.

7. The electronic price label as recited in claim 1, wherein the second portion additionally displays promotional information.

8. The electronic price label as recited in claim 1, further comprising data registers for storing the business information and the price information.

9. An electronic price label comprising:
   a liquid crystal display including a first portion for displaying employee-directed business information and a second portion right of the first portion for displaying price or promotional information, wherein the first portion includes a plurality of segments arranged linearly as a relative scale for displaying the employee-directed business information;
   a memory; and
   control circuitry for receiving the employee-directed business information, for storing the employee-directed business information in the memory, for determining a number of adjacent segments in the first portion to be activated based upon the employee-directed business information, and for activating the determined number of adjacent segments, wherein as the level of the employee-directed business information increases, the number of activated display segments increase.

10. A method of displaying employee-directed business information by an electronic price label comprising:
   (a) receiving a message containing the employee-directed business information from a computer by control circuitry within the electronic price label;
   (b) storing the employee-directed business information in a memory within the electronic price label by the control circuitry;
   (c) determining a number of adjacent linearly-arranged segments to be activated in a first portion of a liquid crystal display within the electronic price label for displaying employee-directed business information based upon the employee-directed business information; and
   (d) activating the determined number of adjacent segments, wherein as the level of the employee-directed business information increases, the number of activated display segments increase.

11. The method as recited in claim 10, further comprising:
   (e) receiving other information including price or promotional information in the message with the employee-directed business information by the control circuitry;
   (f) storing the other information in the memory; and
   (g) displaying the other information in a second portion of the liquid crystal display adjacent the first portion by the control circuitry.

12. The method as recited in claim 10, wherein element (c) comprises:
   (c-1) receiving a list of the number of segments from the computer.

13. An electronic price label (EPL) system comprising:
   a host system including a storage device for storing price information of an item and business information related to the item, the host system including a transmitter for transmitting messages to an EPL associated with the item, the messages including the price information and the business information; and
   the EPL including a receiver for receiving the messages and a display including a first portion comprising a plurality of segments arranged linearly as a relative scale for displaying the business information and a second portion for displaying the price information, wherein as the level of the business information increases, the number of activated display segments increase.

14. The EPL system of claim 13 wherein the EPL farther comprises control circuitry for determining a number of segments in the first portion to be activated based upon the business information.

15. The EPL system of claim 14 wherein the host system transmits additional messages to the EPL when a new price information or new business information is stored in the record associated with the EPL.

16. The EPL system of claim 14 wherein the host system transmits an additional message to the EPL when the price information stored in the record associated with the EPL does not match the price information displayed by the EPL.

17. The EPL system of claim 14 wherein the host system transmits an additional message to the EPL when the business information stored in the record associated with the EPL does not match the business information displayed by the EPL.

* * * * *

UNITED STATES PATENT AND TRADEMARK OFFICE
CERTIFICATE OF CORRECTION

PATENT NO. : 6,445,370 B1
DATED : September 3, 2002
INVENTOR(S) : Goodwin, III

It is certified that error appears in the above-identified patent and that said Letters Patent is hereby corrected as shown below:

Title page,
Insert:
-- [73] Assignee: NCR Corporation, Dayton, OH --

Signed and Sealed this

Thirtieth Day of December, 2003

JAMES E. ROGAN
*Director of the United States Patent and Trademark Office*